US006476950B1

United States Patent
Ciaramella

(10) Patent No.: US 6,476,950 B1
(45) Date of Patent: Nov. 5, 2002

(54) METHOD FOR OPTICAL SIGNAL TRANSMISSION WITH CHROMATIC DISPERSION COMPENSATION THROUGH CHIRPED OPTICAL FIBRE GRATINGS, AND OPTICAL COMMUNICATION SYSTEM USING THE METHOD

(75) Inventor: Ernesto Ciaramella, Rome (IT)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/294,825

(22) Filed: Apr. 19, 1999

(30) Foreign Application Priority Data

Apr. 28, 1998 (IT) .......................................... TO98A0362

(51) Int. Cl.⁷ ............................................. H04B 10/00
(52) U.S. Cl. ......................... 359/161; 359/173; 359/153
(58) Field of Search ................................. 359/110, 161, 359/153, 179

(56) References Cited

U.S. PATENT DOCUMENTS

| 5,023,947 A | * 6/1991 | Cimini et al. ................ 359/189 |
| 5,864,414 A | * 1/1999 | Barnsley et al. ............. 359/125 |
| 6,229,631 B1 | * 5/2001 | Sato et al. ................... 359/110 |
| 6,320,687 B1 | * 11/2001 | Ishikawa ..................... 359/161 |

FOREIGN PATENT DOCUMENTS

| EP | 0 884 866 A1 | 12/1998 |
| JP | 10-274715 | 10/1996 |
| JP | 10-284218 | 10/1997 |
| JP | 10-107773 | 4/1998 |

OTHER PUBLICATIONS

Ishikwa:"10–GB/S Repeaterless Transmission . . . " IEICE Tokyo, vol. E78–C, No. 1, 95, pp. 43 XP0004950982.
Loh et al, 10 CM Chirped Fibre Bragg Grating . . . , Elec. Letters, vol. 31, No. 25 , Dec. 7, 1995, pp. 2203–2204.
Mason P L et al, "Increasing the Transmission Distance . . . ", vol. 31, No. 4, Feb. 16, 1995, 281–282.
International Publication No. WO97/34379, pamphlet.

* cited by examiner

Primary Examiner—Leslie Pascal
Assistant Examiner—Christina Y Leung

(57) ABSTRACT

In a communication system with an optical fibre transmission line (3), a compensation of chromatic dispersion due to the fibre (3) is performed through at least one compensation module (4; 4A . . . 4N) based on chirped optical fibre gratings having a group delay characteristic $\tau(\omega)$ which exhibits ripples around a nominally linear profile, as a function of the optical signal frequency. To minimise the effect of said ripples, the compensation is carried out in such a way that, for a given fibre length (3), the operating point is located in a limited slope region along the curve representative of system performance degradation owing to chromatic dispersion.

10 Claims, 3 Drawing Sheets

METHOD FOR OPTICAL SIGNAL TRANSMISSION WITH CHROMATIC DISPERSION COMPENSATION THROUGH CHIRPED OPTICAL FIBRE GRATINGS, AND OPTICAL COMMUNICATION SYSTEM USING THE METHOD

FIELD OF THE INVENTION

The present invention relates to optical communication systems and, more particularly, to an optical signal transmission method in which a compensation of the chromatic dispersion of the line is effected by means of compensation modules with a nominally linear characteristic (specifically, chirped optical fiber gratings). The invention also relates to a communication system using such a method.

BACKGROUND OF THE INVENTION

Silica fibers of different characteristics are the most commonly used transmission lines in optical fiber communication systems. Among such fibers, the so-called conventional single mode fibers, which are widespread all over the world and make up more than half of all installed lines, substantially show no chromatic dispersion at wavelengths within the so-called "second transmission window" (namely wavelengths around 1.3 $\mu$m).

In order to compensate optical signal attenuation due to propagation along the fiber, use is increasingly being made of optical amplifiers, which obviate the need for optical-to-to=electrical conversion and vice versa at the repeaters. The most commonly used optical amplifiers show, however, their highest operation efficiency at wavelengths within the so-called third transmission window (i.e. wavelengths around 1.5 $\mu$m). At such wavelengths the conventional fibers have their minimum attenuation, but exhibit a considerable chromatic dispersion, in the order of 15–20 ps/nm/km. Consequently, a strong pulse broadening originates and this is a hindrance to long distance high bit rate transmissions.

In particular, chromatic dispersion effects increase as signal bit rate increases and have a great influence on NRZ signals already at bit rates of about 10 Gbit/s. As a matter of fact, under these conditions, which are of immediate interest to operators, chromatic dispersion limits the maximum length of a link to about 70 km on conventional fibers. For longer links it is therefore necessary to make use of chromatic dispersion compensation techniques.

Among such techniques, use of chirped optical fiber gratings (i.e. gratings in which the pitch is variable) appears to be greatly attractive, since such gratings allow use of compensation modules which are compact and exhibit low insertion loss.

A chirped optical fiber grating may be compared to a sequence of constant pitch gratings, each reflecting a given wavelength and transmitting all other wavelengths. In general, the pitch linearly varies along the grating. A compensation module using such a grating can be connected to the optical fiber transmission line so that the different wavelengths within the signal to be compensated travel along the grating, are reflected and are reinserted into the line with different transmission delays. This can be exploited to compensate chromatic dispersion. To achieve this compensation it is necessary to choose such a pitch behavior that the grating has a group delay t which is linearly dependent on optical frequency $\omega$ in complementary manner to group delay in the fiber.

However, chirped gratings usually show a group delay vs. optical frequency characteristic that is not perfectly linear due to technological reasons (in particular, owing to the impossibility of having gratings of infinite length and to discontinuities resulting from pitch variations). It has been demonstrated that the presence of ripples in the characteristic $\tau(\omega)$ (i.e. of fluctuations around the linear behavior) affects system performance. In particular, these effects depend on the ripple period and are higher when the ripple period (in terms of optical frequency) is close to the bit rate of the transmitted signal. These ripples, even if constant in time, cannot practically be foreseen and their impact on transmission system is strictly dependent on the optical carrier frequency which, as known, may in turn fluctuate around its nominal value. Thus their compensation is practically impossible.

The only way to reduce this effect is therefore to try to manufacture gratings in which said ripples are kept as limited as possible. Nevertheless, it must be considered that, in order to keep manufacturing costs limited, there is a trend to manufacture gratings which compensate chromatic dispersion in line spans of a predetermined length, usually less than 100 km. Thus, in order to compensate the chromatic dispersion over a rather long line, it may be necessary to resort to a number of gratings and their individual effects are likely to cumulate.

The interest in a method of reducing the influence of those ripples is therefore obvious. No solutions to this problem are available from literature so far.

SUMMARY OF THE INVENTION

The invention is based on an accurate analysis, carried out by the inventor, concerning the behavior of an optical communication system where chromatic dispersion compensation is carried out by means of gratings. This analysis has shown that the effect of ripples in the characteristic $\tau(\omega)$ of the grating(s) on the system not only depends on the global characteristics of the grating(s) (i.e. amplitude and frequency of said ripples), but also on parameters relating to the transmitter, to the line amplifiers and to the fiber. In particular there are configurations showing a much higher tolerance to the grating defects.

According to the invention, a method for optical signal transmission is provided wherein, in order to minimize the influence of the fluctuations around a nominally linear behavior of the delay group vs. optical frequency characteristic $\tau(\omega)$ of a compensation module, a curve representative of the system performance degradation due to chromatic dispersion is determined and, for a given line span length, the compensation is effected so that the operating point along the degradation curve is kept within a region of limited slope of said curve As will be shown, this solution is based on the fact that, according to what has been highlighted by the inventor, the impact of grating defects can be seen as a compensation fluctuating around an ideal value.

Advantageously, the compensation module is based on the use of chirped optical fiber gratings.

The degradation curve may be, for instance, a curve representing the power penalty with respect to a reference condition (that is, a curve representing the eye diagram closure) of the transmission system when varying the fiber length on which dispersion compensation is carried out.

The present invention also provides an optical fiber transmission system using the method, wherein, for chromatic dispersion compensation, use is made of at least one compensation module with a delay group vs. optical frequency characteristic which is nominally linear, with such a slope

BRIEF DESCRIPTION OF THE DRAWING

Reference is made to the accompanying drawing wherein.

SPECIFIC DESCRIPTION

Figure 1:
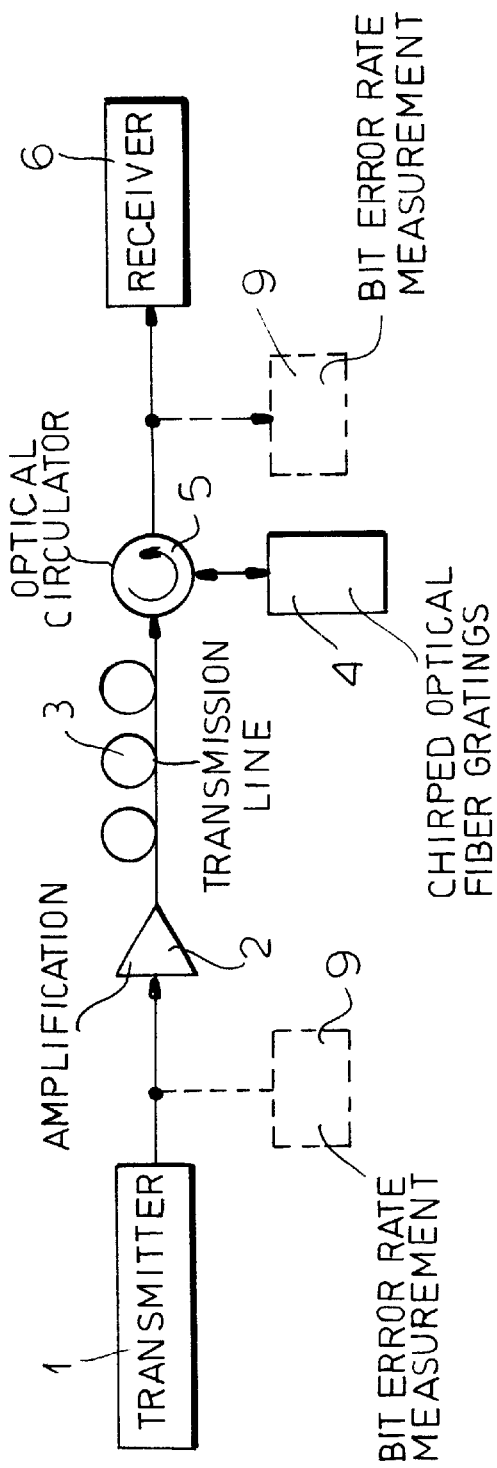
FIG. 1 is a simplified block diagram of an optical fiber transmission system with chromatic dispersion compensation by means of optical fiber gratings.

As can be seen in FIG. 1, a fully optical transmission system with chromatic dispersion compensation can comprise:

transmitter 1;

amplification devices 2 (in particular, active fiber amplifiers); for drawing simplification, only one amplifier, located at the output of transmitter 1, is depicted;

optical fiber transmission line 3, that induces on the signals transmitted a chromatic dispersion which, when conventional silica fibers are used, is of the order of 17 ps/nm/Km.

chromatic dispersion compensation devices, that preferably include one or more chirped optical fiber gratings 4; the number and the positions of such devices along the line depend, among other things, on the link length and on the signal power; for drawing simplification, a device made of a single grating has been shown, which device is connected to line 3 through an optical circulator 5; and receiver 6.

Figure 2:
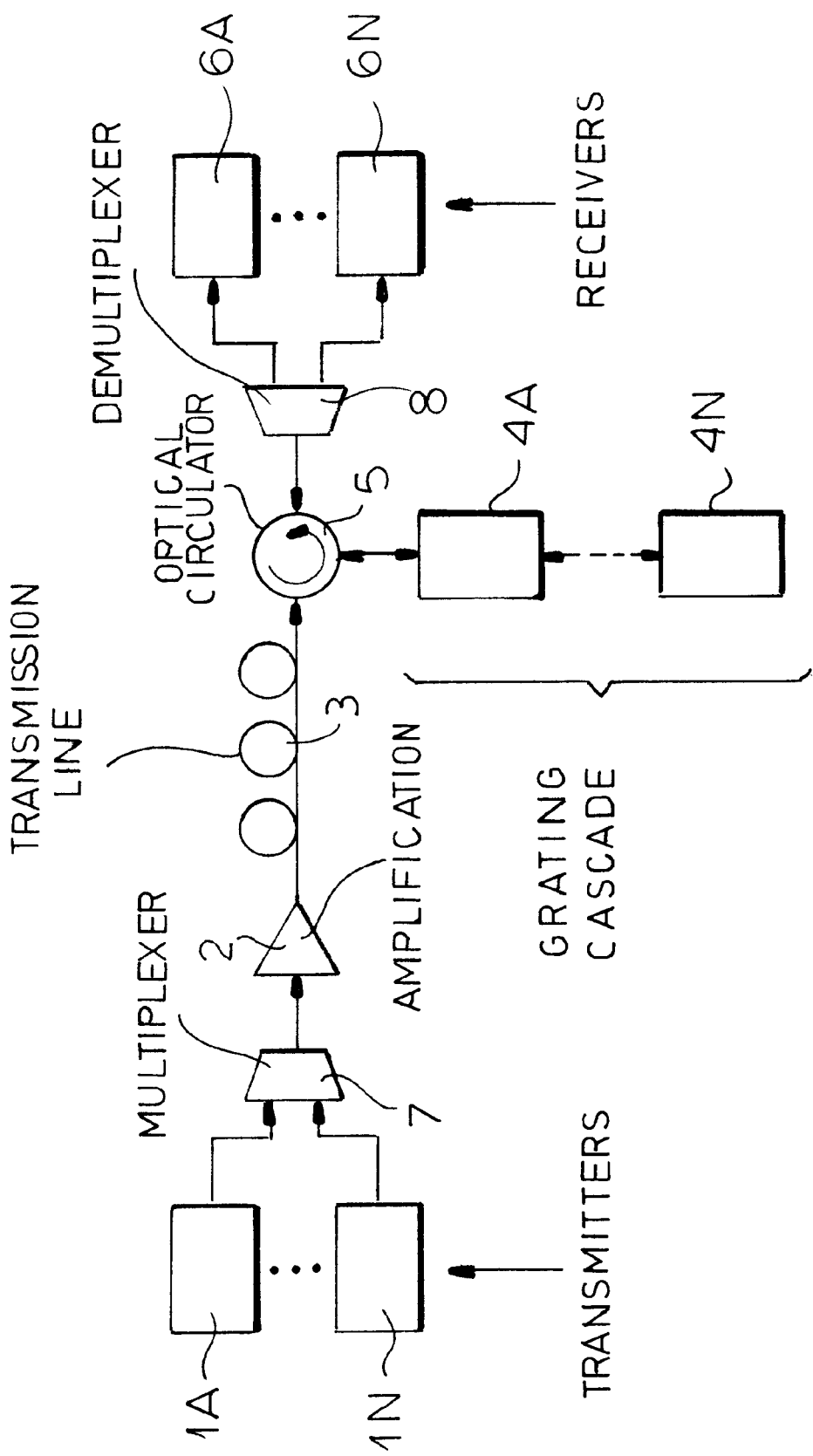
FIG. 2 is a block diagram similar to that of FIG. 1 relating to a wavelength division multiplexing transmission system.

The diagram in FIG. 1 relates to the transmission of signals at only one wavelength. In case of a wavelength division transmission, the diagram of FIG. 2 applies: there are N transmitters 1A . . . 1N, whose signals are multiplexed over the line through a multiplexer 7, and N receivers 6A . . . 6N, that receive the signals relating to their respective channel through a demultiplexer 8. The or each compensation device generally includes N cascaded gratings 4A . . . 4N, each capable of effecting compensation on the signals of one of the channels.

Figure 3:
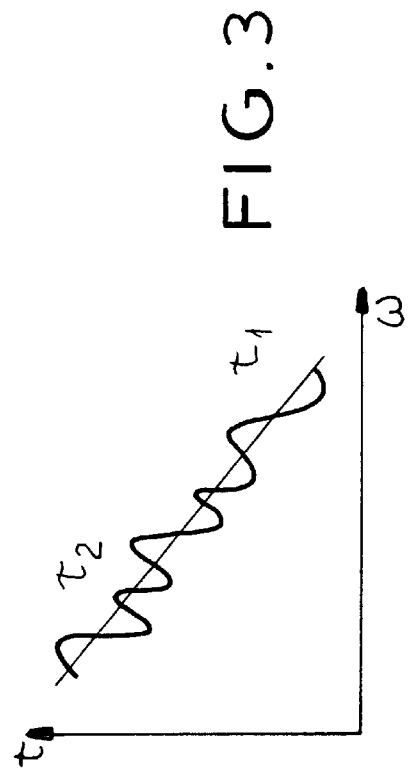
FIG. 3 is a diagram of the group delay vs. optical frequency characteristic of a compensating module employing optical fiber gratings.

FIG. 3 shows the behavior of the group delay characteristic $\tau$ of a chirped grating as a function of the optical frequency ($\omega$) of the signal. The behavior is nominally linear, with a certain slope a as shown by line $\tau_1$. Nevertheless, as previously said, for manufacturing reasons, the group delay presents unforeseeable fluctuations with respect to the values corresponding to the linear behavior and therefore its behavior is in fact the one shown by line $\tau_2$. Further, for the emission frequency of the sources there is a tolerance interval with respect to the nominal value and such a frequency of the sources there is a tolerance interval with respect to the nominal value and such a frequency fluctuates in an unpredictable way around the real value. Thus the operating point (fiber length actually compensated) cannot be precisely predetermined and it unpredictably moves along the characteristic, thus making it impossible to provide for an accurate compensation.

The analysis of the behavior of a whole transmission system has led the inventor to ascertain that the ripples of $\tau(\omega)$ do not independently affect system performance and that their global impact on the transmission system is also dependent on the parameters of the transmitter, of the amplification systems and of the transmission line (in particular, the uncompensated line length). As a consequence, to minimize penalties on system performance, it is not sufficient to use a grating compensating the dispersion due to a given portion of the total line length and showing minimum ripples, but it is necessary to take into account the system within which the grating has to be inserted.

Figure 4:
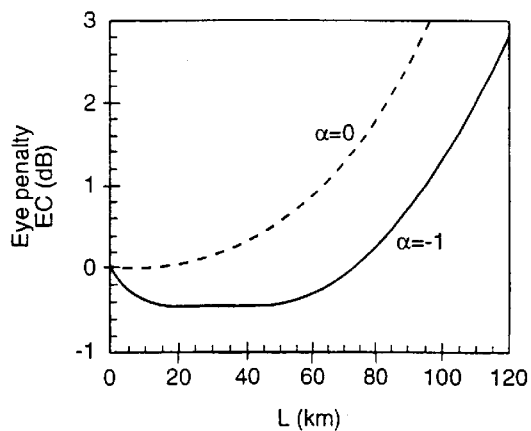
FIGS. 4 to 9 are diagrams of system degradation due to group delay ripples for different ripple frequencies and propagation conditions.

As a matter of fact, qualitative curves as shown in FIG. 4 may be drawn, representing performance degradation (penalty EC of the eye diagram, given in dB, referred to the opening at transmitter 1), as a function of the uncompensated length L of the fiber, given in km. The data necessary to draw the curves may be obtained through methods well-known in the art, e.g. by means of a conventional equipment for bit error rate measurement to be connected to the system, as shown by blocks 9 in FIG. 1.

The curves in FIG. 4 relate to two different types of transmitters having different values (0, −1) of the so called chirp parameter $\alpha$, in case of a 10 Gbit/s transmission under linear conditions along a conventional fiber with a dispersion D=17 ps/nm/Km at 1.55 $\mu$m. Parameter $\alpha$ is a coefficient that characterizes the spurious frequency modulation due to the external modulator. This type of modulator is typically present in transmission systems for which chromatic dispersion compensation is a primary requirement. The curves show that for different chirp parameters there is a different system sensitivity to chromatic dispersion. In particular, transmitters which have a negative value of the chirp parameters exhibit a better performance on conventional fibers.

Figure 5:
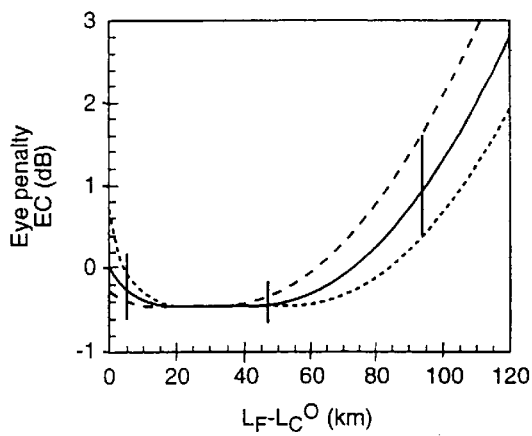

The curves in FIG. 4 have been drawn for an ideal grating, without ripples of $\tau(\omega)$. In case of a real grating, similar curves can still be applied. Yet it is to be taken into account that, as will be seen below the uncompensated fiber length can be regarded as variable. FIG. 5 shows, for $\alpha=-1$, a few curves relating to different compensation conditions, as a function of the so called equivalent fiber length $L_{eq}$ (difference between length $L_F$ of fiber 3 in FIGS. 1 and 2 and the length compensated by an ideal grating with a same slope of the characteristic). It can be deduced that the effect of the ripples of $\tau(\omega)$. can be minimized by acting in such a way that the uncompensated fiber length is located in a region of the degradation curve where the curve has a limited slope (and preferably zero slope). Under these conditions system tolerance is the highest.

For a better understanding of the invention, the theoretical considerations on which the invention is based are set forth. As a starting hypothesis, it has been assumed that the behavior of the individual ripples of group delay $\tau(\omega)$ can be substantially considered sinusoidal. Thus the following relation applies:

$$\tau(\omega)=a\omega+A\sin(2\pi\omega/\Omega+\phi) \quad (1)$$

where a has the meaning set forth above, and

A, $\Omega,\phi$ are the amplitude, the period (measured in terms of optical signal frequency) and the phase of the ripples, respectively.

This approximation is not arbitrary and does not imply particular generality losses for intervals of ω corresponding to the bandwidth of the signal transmitted over the line, and it usually used in literature.

The total grating dispersion is given by dτ/dω. If an ideal grating (A=0) is considered, dispersion is clearly constant and its values is a. For a fiber, however, dispersion is given by $\beta_2 \cdot L_F$, where $\beta_2$ is the chromatic dispersion coeffficient, given in ps$^2$/nm, and $L_F$ is the fiber length. An ideal grating with coefficient (slope of the characteristic) a is therefore capable, if applied to a fiber with chromatic dispersion coefficient $\beta_2$, of compensating chromatic dispersion in a fiber length $$L_c^0 = a/\beta_2.$$

In other terms, in respect of chromatic dispersion, the system behaves as if the line were formed by a fiber with length $$L_{eq} = L_F - L_c^0.$$

If the fluctuations of τ(ω) are relatively slow, for instance such that Ω/2π>20 GHz, their effect on a signal for example at 10 Gbit/s (which, as already said, is a bit rate of immediate practical interest to operators) can be analytically described by taking into account only the first order term of Taylor series expansion of (1). In this approximation it can be seen that the grating behaves, with respect to a signal at frequency ω $_s$, as an ideal compensating unit having a compensation length $L_c$ given by $$L_C = \frac{1}{\beta_2}\left(\frac{d\tau}{d\omega}\right)\bigg|_{\omega_s} = \frac{1}{\beta_2}\left(a + A\frac{2\pi}{\Omega}\cos\left(\frac{2\pi}{\Omega}\omega_s + \varphi\right)\right) = L_C^0 + \Delta(\omega_s) \quad (2)$$

Therefore the optical signal at optical frequency ω $_s$ experiences a compensation length varying around $L_c^0$ and dependent on the ripple amplitude and phase. Relation (2) shows that the system is extremely sensitive to the carrier frequency, so that also variations of few GHz (i.e. of few hundreds of nanometer, and therefore rather lower than the tolerance accepted for the nominal wavelength of lasers) lead to highly different values of $L_c$.

This assumption is confirmed also by numerical simulations carried out for values of the grating ripple frequency comparable with the signal bit rate, for which values the series development approximation would not be justified.

To better clarify what has been set forth above, some numerical examples of performance evaluations of a transmission system are given here. The system considered made use of a transmitter 1 that sent out 10 Gbit/s signals over a 130 Km line of conventional optical fiber. At the receiving end there was a grating with A=10 ps. Also for this evaluation the system performance was compared for two transmitters, with α=0 and α=−1, respectively. Performance has been obtained through the analysis of the eye diagram at the receiver for different values of φ.

Figure 6:
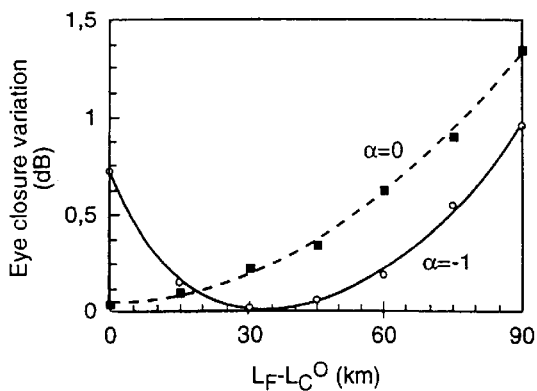
Figure 7:
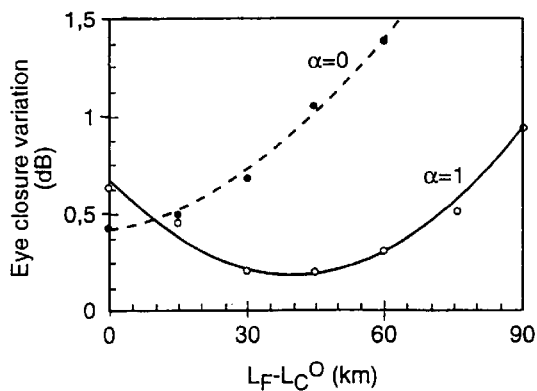

FIGS. 6 and 7 show diagrams relating to the difference between the best and the worst case penalties (i.e. the difference in the eye diagram closure) as the fiber equivalent length $L_{F-Lc}^0$ varied, respectively for slow fluctuations of group delay, with Ω/2π=50 GHz (corresponding to a period Ω=0.4 nm, in terms of wavelength interval) and quick fluctuations, with Ω/2π=12.5 GHz (Ω=0.1 nm), therefore comparable with the transmission bit rate involved. As in FIG. 4, ordinates are given in dB and abscissas in km.

The analysis carried out by the inventor has proved that the curves in FIGS. 6 and 7 have a behavior substantially reproducing the behavior of the module of the derivative of the corresponding curves in FIGS. 4, 5. Thus, from the curves reported in FIGS. 4 and 5 and from equation (2) one can derive the impact of delay group ripples on system performance. When φ varies, $L_c$ varies according to equation (2) around the value $L_c^0$. Hence the eye opening also varies and the maximum variation will depend on the value of the derivative of the penalty curve in correspondence with value $L_F - L_c^0$ of the uncompensated length. Thus, the impact on the system will be minimized if $L_F - L_c^0$ is such that the system operates at the minimum of the penalty curve, where the derivative becomes zero. The comparison between the curves of FIG. 6 and those of FIG. 4, 5 shows that the effect of ripples becomes actually negligible when this invention is used. In particular, it can be seen that the impact of the ripples is minimized for $L_F - L_c^0 \approx 0$ in case of α=0, and for $L_F - L_c^0 \approx =30$ km in case of α=−1.

FIG. 7 shows that also in case of ripples with a frequency comparable to the signal bit rate, the effect of ripples can still be minimized, even if it cannot be completely cancelled as in the case of slow fluctuations.

In a wavelength division transmission, the same behavior is observed for each channel.

Figure 8:
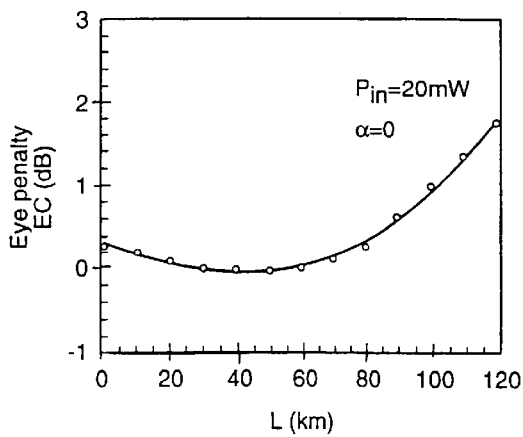
Figure 9:
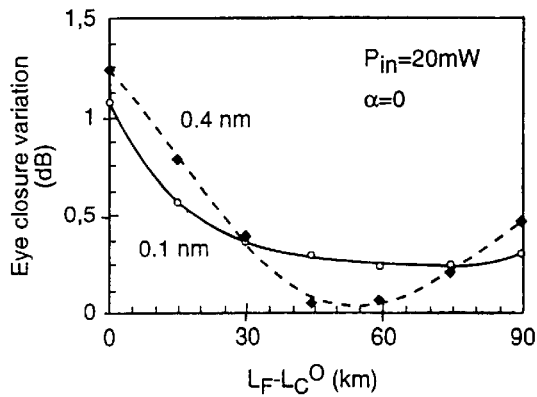

What has been described above applies, as already said, to the case of linear propagation of the signal on a conventional fiber line, i.e. in the case in which amplifiers 2 do not raise the optical signal power to such a level that non-linear phenomena (such as the Self Phase Modulation) are no longer negligible. These nonlinear phenomena affect in turn the system sensitivity to the ripples of τ(ω). Tests performed on a system as the one of FIG. 1, by using a signal with power of the order of 20 mW, have shown that it is still possible to cancel the effect of the ripples. In this case, however, due to the self phase modulation, the minimum performance degradation occurs for an uncompensated fiber length different from the previous cases. For instance, the minimum degradation is obtained for $L_F - L_c^0 \approx =55$ km, as can be seen in FIGS. 8 and 9 where results are reported concerning tests under non linear conditions for α=0 (which is the case in which there is the maximum variation with respect to the linear regime behavior) and that can be compared with the curves relevant to α=0 in FIG. 4 and in FIGS. 6 and 7, respectively.

In case of non linear effects caused by amplifiers distributed along the line, tests have also proved that it is advantageous to carry out compensation on the individual spans and that an adaptation of the individual compensations is necessary in order to optimize global compensation.

It is evident that the description above is provided purely by way of a non-limiting example and that variations and/or modifications are possible without departing from the scope of the invention itself. In particular, even if reference is made to the compensation through the chirped gratings, the description above applies to any compensation module in which the group delay characteristic has behavior similar to that of such gratings. Moreover, even if a single line span has been shown and discussed, the invention can be applied in the case of several line spans each equipped with a compensation module, that of course could be located at the beginning of the span.

I claim:

1. A method of optical signal transmission comprising the steps of:
   introducing an optical signal into an optical fiber transmission line at a transmitter connected to an input to said optical fiber transmission line;
   transmitting said optical signal along said optical fiber transmission line to an output of said optical fiber transmission line;

withdrawing said optical signal at said output by a receiver, whereby said transmitter, said optical fiber transmission line and said receiver form an optical transmission system; and compensating for chromatic dispersion caused by the optical fiber transmission line over a length thereof by:

connecting at least one compensation module to said optical fiber transmission line that has a group delay characteristic τ(ω) fluctuating as a function of signal optical frequency (ω) around a nominally linear behavior, determining a degradation curve representing degradation of performance of the whole of said system due to optical dispersion as a function of length of the optical fiber transmission line, establishing for a given fiber length a region of limited slope of said degradation curve, and operating said at least one compensation module with an operating point limited to fluctuate around a value corresponding to a compensation carried out to maintain said nominally linear characteristic in said region of limited slope of said degradation curve.

2. The method defined in claim 1 wherein said region of the degradation curve is a region where the derivative is substantially zero.

3. The method defined in claim 1 wherein said degradation curve is determined as a power penalty of the transmitted signals when varying the length of the line span for which the chromatic dispersion compensation is effected.

4. The method defined in claim 1 wherein for a transmission over a plurality of wavelength division multiplexed channels, a degradation curve for each channel is determined and the effect of the fluctuations is individually minimized for each channel.

5. The method as claimed in claim 1 wherein the compensation is effected by means of at least one compensation module using chirped optical fibre gratings.

6. An optical fiber communication system comprising a transmitter, amplifiers, an optical fiber transmission line and chromatic dispersion compensation modules, in which a transmitter sends optical signals over said optical fiber transmission line, said chromatic dispersion compensation modules including at least one compensation module having a group delay characteristic t(ω) which exhibits, as a signal optical frequency varies, fluctuations around a nominally linear behavior, said system comprising devices for determining a curve, for the whole of the system, representative of the system performance degradation owing to chromatic dispersion as a function of length of the line, said module having a slope of said group delay characteristic such that, for a given fiber length, the operating point on said curve representative of performance degradation lies in a region with limited slope of the curve.

7. The system defined in claim 6 wherein said module has a slope of said group delay characteristic such that said operating point is located in correspondence with a minimum of said curve.

8. The system defined in claim 6 wherein, for the transmission of signals belonging to a plurality of wavelength division multiplexed channels, said devices for chromatic dispersion compensation are capable of effecting the compensation individually for each channel.

9. The system defined in claim 6 wherein the chromatic dispersion compensation is carried out with a plurality of compensation modules, each capable of effecting the compensation for one of the channels, and in that each module has a slope of said group delay characteristic such that the operating point on a respective curve representative of the system performance degradation due to chromatic dispersion lies in a region of limited slope of said curve.

10. The system defined in claim 6 wherein said module includes a chirped optical fiber grating.

* * * * *